United States Patent [19]

Murakami et al.

[11] Patent Number: 5,249,784
[45] Date of Patent: Oct. 5, 1993

[54] VIBRATION ISOLATING SUPPORT DEVICE

[75] Inventors: Kazutomo Murakami, Yokohama; Keiichiro Mizuno, Tokyo; Kazuyoshi Iida, Iruma; Toshihiro Miyazaki, Yokohama, all of Japan

[73] Assignee: Bridgestone Corporation, Tokyo, Japan

[21] Appl. No.: 527,505

[22] Filed: May 23, 1990

[30] Foreign Application Priority Data

Jun. 1, 1989 [JP] Japan ................................. 1-137389

[51] Int. Cl.⁵ ............................................. F16F 13/00
[52] U.S. Cl. ............................. 267/219; 188/267; 248/563; 248/565; 248/566; 248/636; 267/140.14
[58] Field of Search ................. 188/267; 267/140.1 R, 267/140.1 AE, 140.1 E, 219; 248/566, 563, 565, 636

[56] References Cited

U.S. PATENT DOCUMENTS

| 4,720,087 | 1/1988 | Duclos et al. ............. 267/140.1 AE |
| 4,759,534 | 7/1988 | Hartel ............................. 188/267 X |
| 4,893,800 | 1/1990 | Tabata ........................... 188/267 X |
| 4,973,031 | 11/1990 | Takano et al. ................. 188/267 X |

FOREIGN PATENT DOCUMENTS 297608  1/1989  European Pat. Off. ............ 267/219

Primary Examiner—George E. A. Halvosa
Attorney, Agent, or Firm—Sughrue, Mion, Zinn, Macpeak & Seas

[57] ABSTRACT

A vibration isolating device comprises a base, a plurality of support members each placed onto the base and comprised of a two series layer of an electroviscous body and an elastomeric body, and a cradle supported through these support members. These support members are provided with circuit for applying voltage to each electroviscous body, respectively.

7 Claims, 8 Drawing Sheets

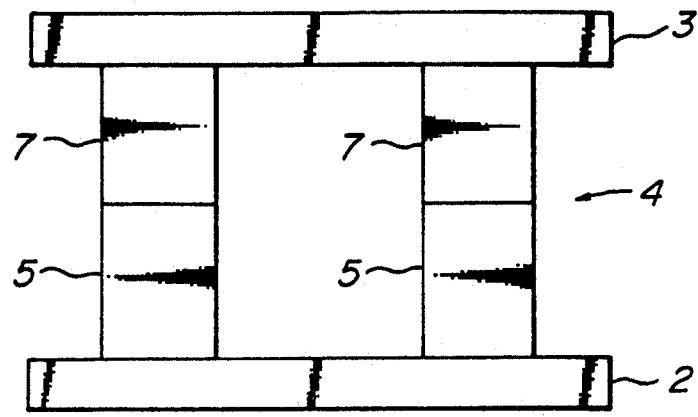
FIG_1
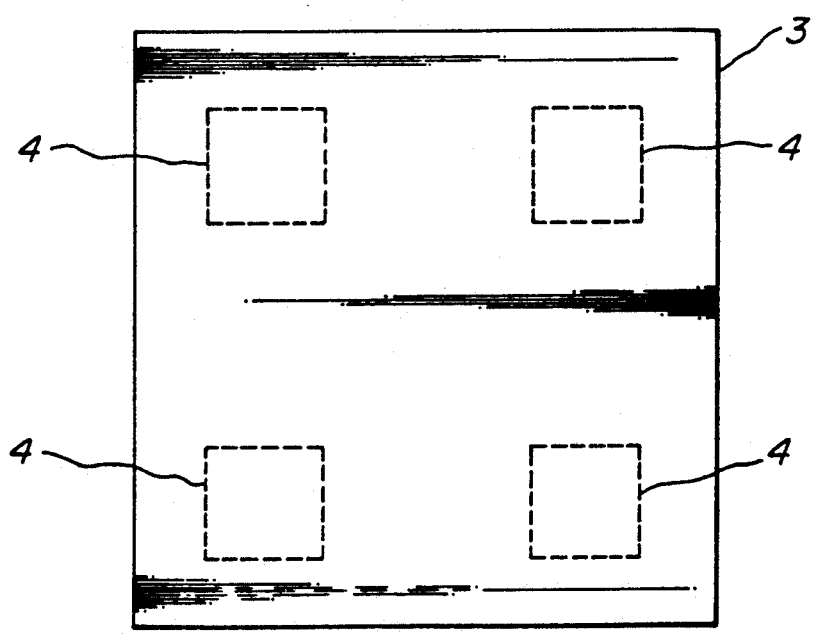
FIG_2

FIG_3
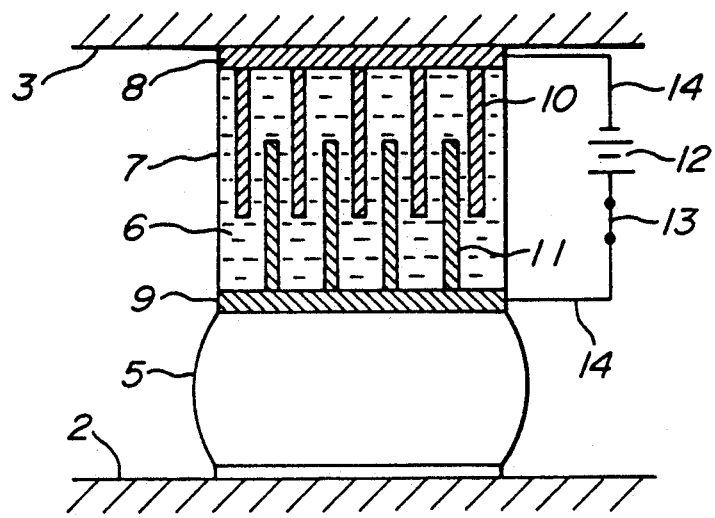
FIG_4
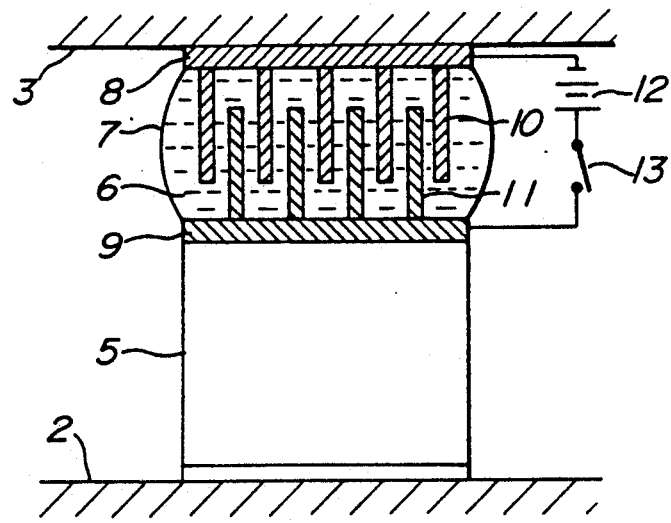

FIG_10
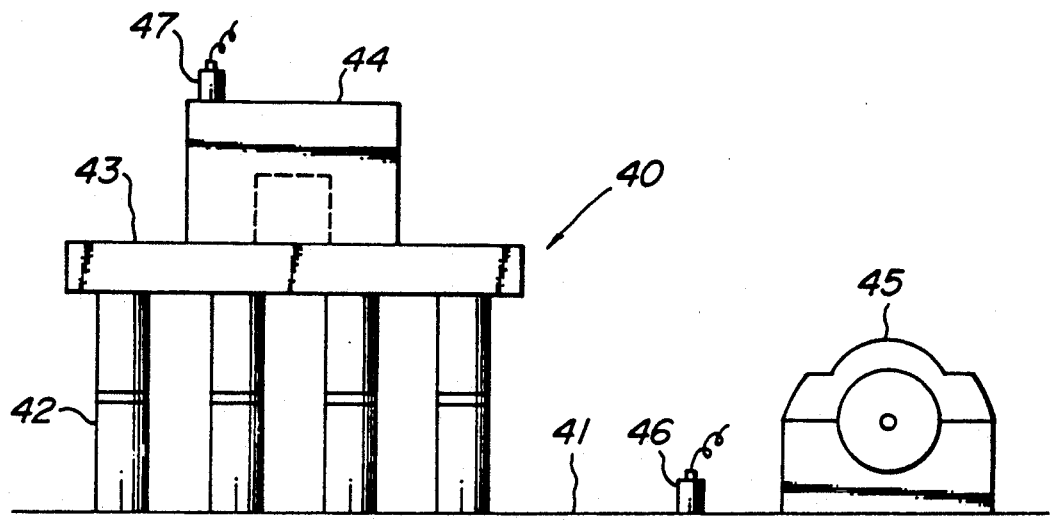
FIG_11
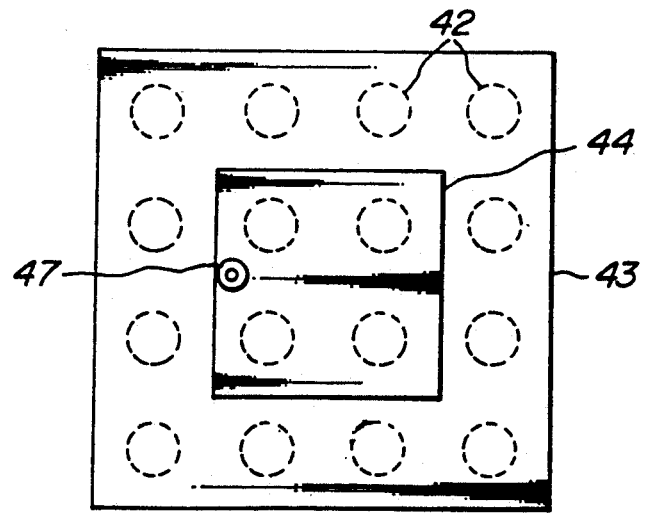

FIG_14
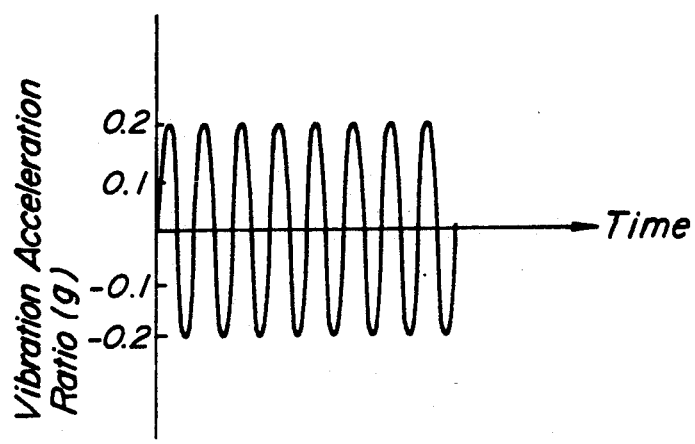
FIG_15
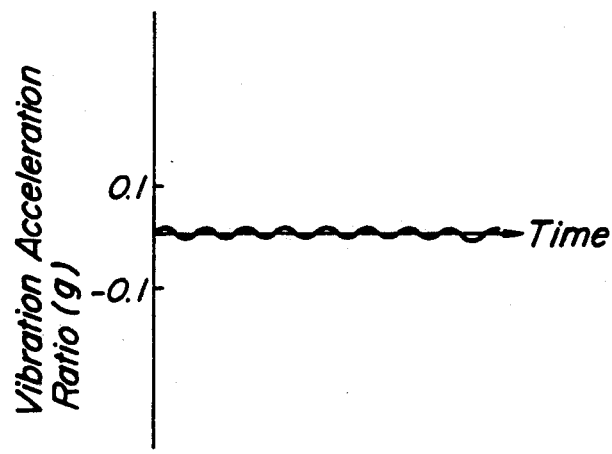

FIG_16
PRIOR ART
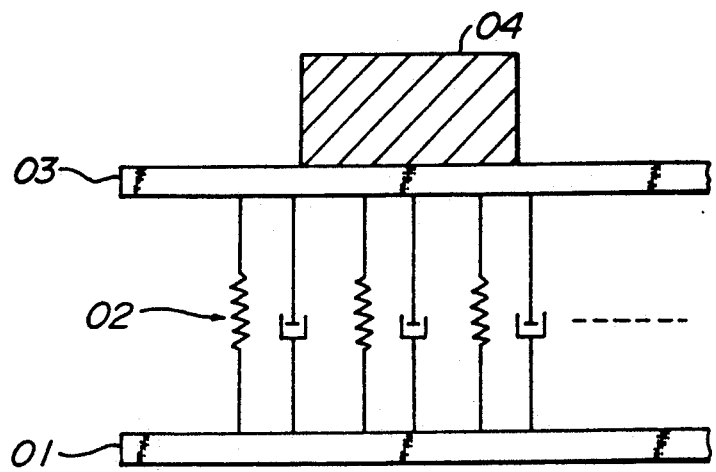
FIG_17
PRIOR ART
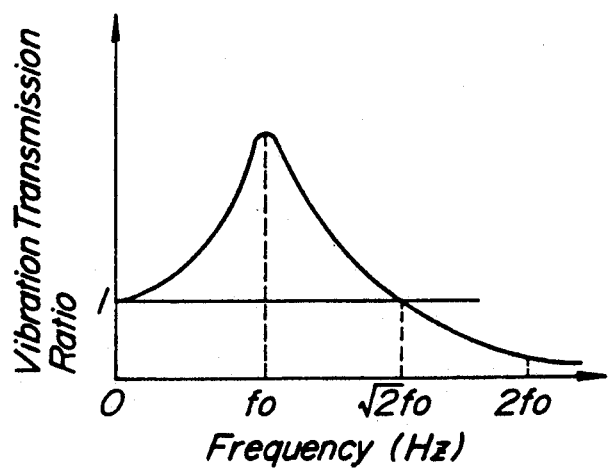

VIBRATION ISOLATING SUPPORT DEVICE

BACKGROUND OF THE INVENTION

1. Field of the Invention

This invention relates to a support device provided with a vibration isolating structure for reducing vibrations transmitted from a vibration source side to a vibration isolating side.

2. Related Art Statement

In case of transporting or setting precision instruments and the like, or in case of setting power machines and the like generating vibration, there is a vibration isolating support method as a countermeasure for preventing occurrence of such vibrations.

In general, a vibration isolating support device has a structure supporting a cradle together with a rubber isolator, an elastic member such as metal spring, air spring or the like, and if necessary, an attenuator and is interposed between vibration source and vibration isolating means to shut off vibrations.

Such a vibration isolating support device is schematically shown in FIG. 16.

A cradle 03 is supported on a base 01 through a vibration isolating support device 02, and an object 04 is placed on the cradle 03.

Concerning the object 04, there are considered two cases, a first case of which being a vibration isolating body such as a precision instrument and a second case being a vibration generating body such as motor or the like.

The vibration isolating support device 02 comprises plural elastic members and an attenuator and exhibits constant dynamic properties (spring constant K, attenuating factor C) as a whole.

The frequency characteristic of such a vibration transmission ratio (response magnification) in this vibration isolating device is shown in FIG. 17.

As seen from FIG. 17, a large peak of the vibration transmission ratio is shown through resonance at a constant resonance frequency of $f_0 = \sqrt{K/M}/2\pi$. A vibration isolating area wherein the transmission ratio is not more than 1 is a frequency zone of more than $\sqrt{2}f_0$.

Therefore, the above device has a vibration isolating effect against vibrations having a frequency of more than $\sqrt{2}f_0$ and can isolate vibrations.

Moreover, M is a weight on the vibration isolating device 02 (i.e. total weight of cradle 03 and object 04).

The vibration frequency f of vibration source is resonated in the vicinity of $f_0$ to inversely amplify vibrations and transmit toward the vibration isolating side, so that it is always required to use the device at the vibration isolating zone of more than $\sqrt{2}f_0$.

That is, the minimum frequency $f_{min}$ of vibration frequency f of the vibration source side and the resonance frequency $f_0$ are necessary to satisfy a relationship of $\sqrt{2}f_0 < f_{min}$.

When the weight M and the vibration frequency f of the vibration source side are previously known, the resonance frequency $f_0$ satisfying the above relationship is determined, and then the vibration isolating device should be designed so as to obtain such a resonance frequency $f_0$. However, when the weight M and vibration frequency f are not known, or when they are not constant, it has been difficult to design the optimum device. Therefore, the above vibration isolating device is suitable when the motor or the like is semi-permanently placed, but is not suitable when the loading weight on the cradle is not specified or is varied, or when the vibration frequency f always varies.

For example, in case of a vibration isolating support member for transportation of precision instruments or the like and vibration removing base, the kind, number and the like of the precision instruments loaded on the cradle may vary, so that these devices are designed based on average weight M and vibration frequency f. As a result, the optimum design is not always obtained, and according to circumstances the vibration frequency f may approach to the resonance frequency $f_0$ to badly exert on the precision instrument.

Therefore, in order to effectively use such a vibration isolating support device, the use condition is restricted, and consequently the general-purpose use is lacking.

Because, the spring constant K in the conventional vibration isolating device itself is fixed and it is usually difficult to properly change the value K adjusted at the designing stage in use.

For this end, there has hitherto been proposed a method wherein plural vibration isolating devices having various spring constants adjusted every loading object are provided and used properly as the conventional countermeasure. However, such a method has drawbacks in cost and efficiency because the plural devices should be used properly.

Furthermore, in order to use the device at a vibration isolating zone of more than $\sqrt{2}f_0$, it is considered that the spring constant K is designed to a considerably low value so as to render the resonance frequency $f_0$ into a low initial value. In this case, there is no problem when the weight of the loading object is light, but as the weight becomes heavy, the sinking down of the elastomer in the vibration isolating device 02 or deformation under loading becomes considerably large and hence there is caused a problem in the strength and durability of the vibration isolating device 02.

As a result, the weight of the loading object itself is restricted.

SUMMARY OF THE INVENTION

Under the above situations, the invention is to provide a vibration isolating support device which can always obtain an optimum vibration isolating effect by varying spring constant in accordance with the weight of the loading object.

According to the invention, there is the provision of a vibration isolating device, characterized in that a plurality of support members each comprised of a two series layer of an electroviscous body and an elastomeric body are placed onto a base in parallel with each other, and a cradle is supported through these support members, and said support members are provided with means for applying voltage to each electroviscous body, respectively.

In the electroviscous body, the viscosity increases through the application of the voltage, and properties as a rigid body are exhibited at a voltage above a certain value.

That is, the spring constant of the device as a whole can easily be adjusted by selectively applying voltage to the electroviscous body in the plural support members each comprised of the two series layer of electroviscous body and elastomeric body and supporting the cradle.

Therefore, the voltage is controlled in accordance with the weight of the loading object and the vibration frequency of vibration source side to adjust the spring constant, whereby the optimum vibration isolating effect can be obtained and also the desired strength can be maintained even against a heavy object.

BRIEF DESCRIPTION OF THE DRAWING

The invention will be described with reference to the accompanying drawing, wherein:

FIG. 1 is a side view of an embodiment of the vibration isolating device according to the invention as a whole;

FIG. 2 is a plan view of FIG. 1;

FIGS. 3 and 4 are sectional views of a vibration isolating support member, respectively;

FIG. 10 is a diagrammatical view of an experimental example using another embodiment of the vibration isolating support device;

FIG. 11 is a plan view of the device of FIG. 10;

FIG. 14 is a graph showing a vibration acceleration rate of another loading object (25 kg);

FIG. 15 is a graph showing a vibration acceleration rate of another loading object (25 kg) under different conditions;

FIG. 16 is a schematic view of the conventional vibration isolating support device; and FIG. 17 is a graph showing the vibration transmission ratio of the above conventional device.

DESCRIPTION OF THE PREFERRED EMBODIMENTS

Figure 5:
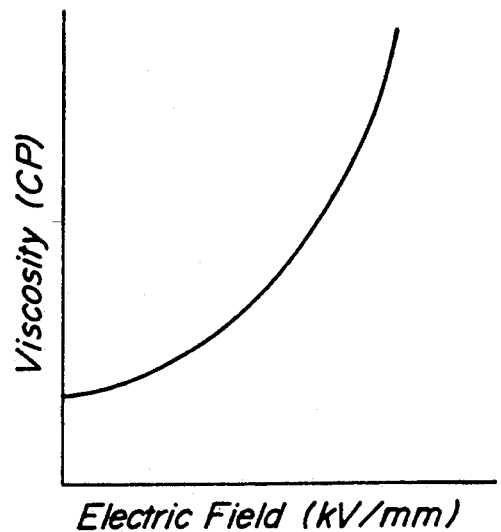
FIG. 5 is a graph showing a change of viscosity in an electroviscous body.

An embodiment of the vibration isolating support device according to the invention will be described with reference to FIG. 1 to FIG. 7.

FIG. 1 is a side view of the vibration isolating support device 1 according to the first embodiment as a whole, and FIG. 2 is a plan view thereof.

In this device, rectangular plate-like base 2 and cradle 3 are positioned upward and downward to face to each other, and four vibration isolating support members 4 are interposed therebetween at four corner portions to support the cradle 3.

The inner structure of the vibration isolating support member 4 is shown in FIGS. 3 and 4.

The vibration isolating support member 4 is comprised of upper and lower layers. The lower layer is a cylindrical rubber body 5, and the upper layer is a square pillar-like bag 7 containing an electroviscous fluid 6 therein.

Plural electrode plates 10, 11 vertically protrude from upper and lower conductive substrates 8, 9 in opposite directions and arranged in the electroviscous fluid 6. These electrode plates 10, 11 are alternately arranged so as to oppose a part thereof to each other.

Lead wires 14 are drawn out from the upper and lower substrates 8, 9 and connected to each other through a direct current source 12 and a switch 13.

The electroviscous fluid 6 is generally obtained by dispersing particles of silica gel or the like into an insulating oil such as silicone oil or the like, and has a property that the viscosity changes in accordance with an intensity of electric field applied and the response thereof is very fast.

FIG. 5 shows a change of viscosity to electric field, wherein an abscissa is an electric field (KV/mm) and an ordinate is a viscosity (CP).

As seen from FIG. 5, when the electric field exceeds a certain value, the viscosity rapidly increases to provide properties as a rigid body.

In the embodiment according to the invention, the electroviscous fluid has a viscosity to a certain extent at a state of applying no voltage and a spring constant smaller than that of the rubber body 5.

Therefore, when the switch 13 is closed to apply a voltage between the electrode plates 10 and 11 as shown in FIG. 3, the viscosity of the electroviscous fluid 6 considerably increases to act as a rigid body against vibrations between the base 2 and the cradle 3. Consequently the rubber body 5 mainly has a vibration isolating effect and spring component is substantially determined by the spring constant of the rubber body 5.

On the other hand, when the switch 13 is opened to stop the application of voltage between the electrode plates 10 and 11 (see FIG. 4), the viscosity of the electroviscous fluid 6 becomes smaller than that of the rubber body 5, consequently the electroviscous fluid 6 mainly has a vibration isolating effect and also the value of spring constant becomes small.

As mentioned above, the spring constant of the vibration isolating support member 4 can be changed into large and small values by on-off of the switch 13.

The voltage applied is dependent upon the distance between opposed electrode plates 10 and 11 and the type of the electroviscous fluid, but it is sufficient to an extent of largely changing the viscosity and is usually several kV.

Furthermore, when the electrode plates 10, 11 are conductive, the material is not particularly restricted. They are desirable to sufficiently ensure durability during the use in the electroviscous fluid 6. For example, use may be made of metals such as gold, silver, copper, iron and the like.

Moreover, the shape of the electrode plate is not particularly restricted, but it is sufficient to have opposed faces between the electrode plates 10 and 11.

The distance between the opposed electrode plates 10 and 11 is preferably 0.1-100 mm, more particularly 1-11 mm.

In this embodiment, plural electrode plates 10, 11 are alternately arranged to produce an approximately constant electric field in the whole of the electroviscous fluid 6 to cause the viscosity change at once.

In this case, however, it is necessary that each top of the electrode plates 10, 11 should always hold a certain distance from the substrates 9, 8 so as not to come into contact therewith. For this purpose, a stopper may be arranged to support the cradle 3.

The experimental results on the vibration isolating support device 1 will be described below.

Figure 6:
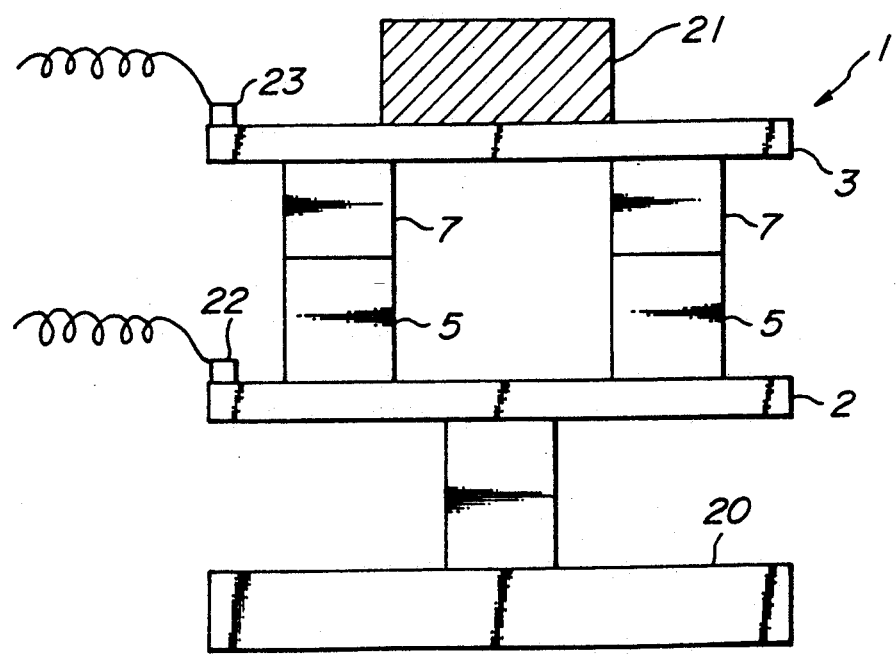
FIG. 6 is a diagrammatical view of an experimental example using the vibration isolating support device.
Figure 7:
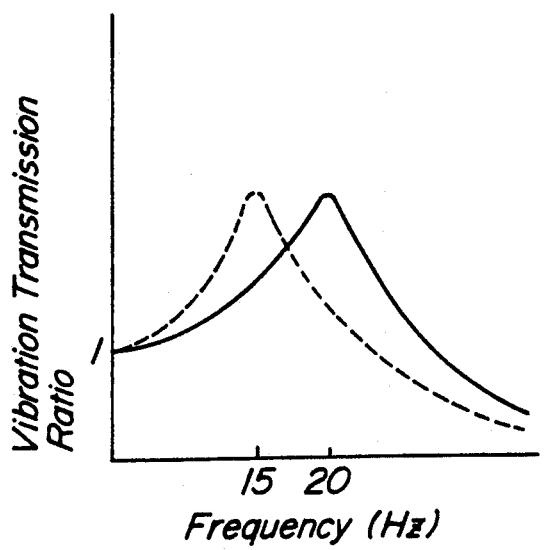
FIG. 7 is a graph showing a vibration transmission ratio in the above experiment.

The experiment was made by placing the vibration isolating support device 1 onto a vibration applying apparatus 20 and a vibration isolating object 21 onto the cradle 3 of the device 1 as shown in FIG. 6. Vibrations input to the vibration applying apparatus 20 are white noise.

Onto the base 2 and the cradle 3 are attached sensors 22 and 23 for the measurement of vibration acceleration rate, respectively. The acceleration signals detected by the sensors 22 and 23 analyzed by a frequency analyzing machine to obtain acceleration rate $\alpha_0$ of the base 2 and acceleration rate $\alpha_1$ of the cradle 3, from which a ratio of both rates or response magnification $|\alpha_1/\alpha_0|$ is calculated.

At first, the experiment was made by applying voltage to all of four vibration isolating support members 4.

In this case, the viscosity of electroviscous fluid 6 in all of four vibration isolating support members 4 increases and the spring constant of the device becomes large state as a whole. As shown by a solid line in FIG. 7, the vibration transmission ratio shows a maximum peak at a frequency of about 20 Hz as a resonance frequency and the vibration isolating zone is more than $20\sqrt{2}$ Hz.

Then, the voltage was applied to only two of four vibration isolating support members 4. In this case, the spring constant of the device as a whole becomes small, and the maximum peak of vibration transmission ratio is shifted as a resonance frequency of about 15 Hz as shown by dotted lines in FIG. 7. Hence, the vibration isolating zone is widened to more than $15\sqrt{2}$ Hz.

As mentioned above, the spring component can easily be changed by selectively applying the voltage to the vibration isolating support members.

Therefore, the spring constant is adjusted by selectively applying the voltage to the vibration isolating support members in accordance with the weight of the vibration isolating object 21 and the input vibrations, whereby the optimum vibration isolating effect can easily be obtained while maintaining the required strength.

Figure 8:
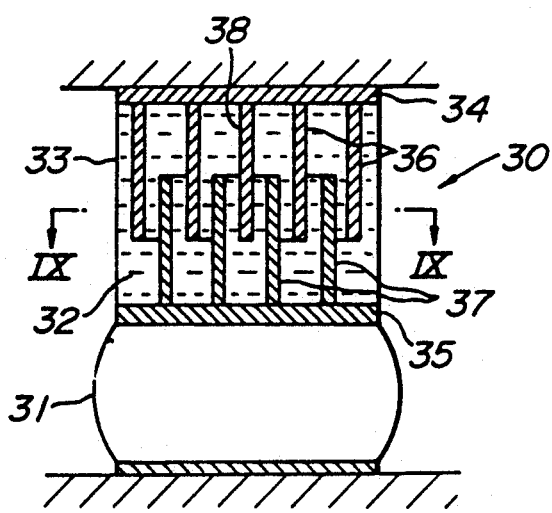
FIG. 8 is a sectional view of another embodiment of the vibration isolating support member.
Figure 9:
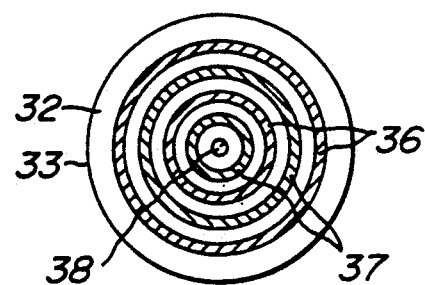
FIG. 9 is a sectional view taken along a line IX—IX of FIG. 8.

In the above embodiment, the electroviscous fluid 6 in the vibration isolating support member 4 is square pillar-like and the flat plate-like electrode plates 10, 11 are arranged side by side inside the electroviscous fluid 6 as shown in FIGS. 3 and 4. Another embodiment of such a structure is shown in FIGS. 8 and 9.

In a vibration isolating support member 30 of this embodiment, a lower layer of rubber body 31 and an electroviscous fluid 32 enclosed in an upper layer of bag body 33 are cylindrical. Also, electrode plates 36, 37 vertically arranged from upper and lower substrates 34, 35 in the electroviscous fluid 32 are cylindrical.

In this case, two cylindrical electrode plates 36 having different radii are vertically arranged from the upper substrate 34 at the same central axis, while a rod-like electrode 38 is vertically arranged in the above central axis, wherein the lower ends of these electrodes are same level.

Similarly, two cylindrical electrode plates 37 having different radii are vertically arranged from the lower substrate 35 at the same central axis. The upper ends of these electrodes are at the same level.

The radii of these upper and lower cylindrical electrode plates 36, 37 are alternately arithmetical progression, and the lower portions of the upper electrode plates 36 are concentrically overlapped with the upper portions of the lower electrode plates 37.

According to the above structure, when the voltage is applied, the viscosity change can be given to the whole of the cylindrical electroviscous fluid 32.

The experiment using such a cylindrical vibration isolating support member 30 will be described below.

FIG. 10 shows a side view of a vibration isolating support device 40 using the above cylindrical vibration isolating support member 30, and FIG. 11 is a plan view thereof.

In the vibration isolating support device 40, 16 vibration isolating support members 42 are vertically arranged on a floor 41 as a base in four rows and four columns at a distance of 0.25 m, and support a rectangular plate-like honeycomb table 43 (1 m × 1 m) as a cradle.

Each of the vibration isolating support members 42 has a switch capable of applying voltage independently.

Onto the honeycomb table 43 is placed an object 44 assumed as a precision instrument.

Furthermore, a rotating machine 45 as a vibration source is placed on the floor 41.

The rotating machine 45 is driven at a revolution number of 1200 rpm, which can mainly give vibrations of 20 Hz to the floor 41.

Moreover, pick-up sensors for acceleration rate 46, 47 are attached onto the floor 41 and the object 44, respectively. The signals detected by these sensors are indicated in form of time series wave through charge amplifiers.

Under the above setting conditions, when the voltage was applied to all of the 16 vibration isolating support members 42 and the object 44 of 100 kg was placed onto the honeycomb table 43, the resonance frequency was 10 Hz as measured from the transmission function. Since the frequency of the rotating machine 45 as a vibration source was 20 Hz, the above resonance frequency was sufficiently included in the vibration isolating zone of more than $10\sqrt{2}$ Hz.

Figure 12:
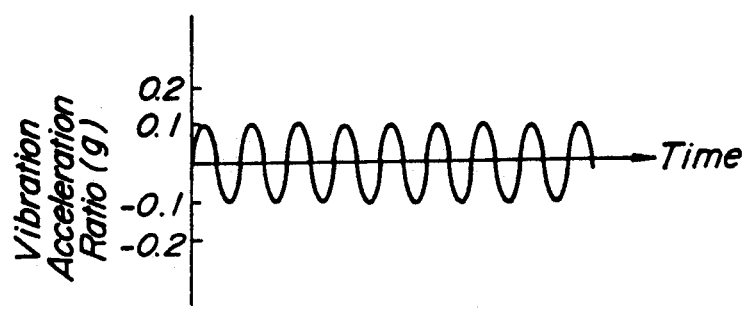
FIG. 12 is a graph showing a vibration acceleration rate of a floor in the above experiment.
Figure 13:
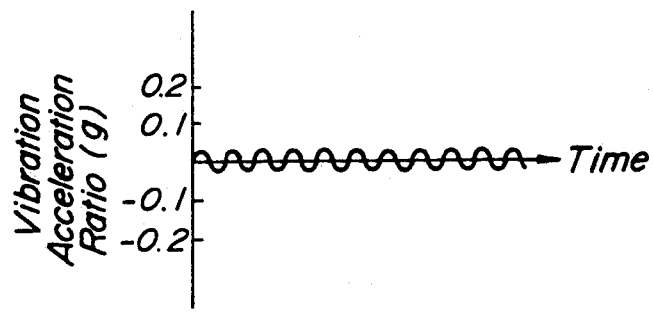
FIG. 13 is a graph showing a vibration acceleration rate of a loading object (100 kg)

When the time series waves of vibration acceleration rates in the floor 41 and the object 44 were measured by driving the rotating machine 45, the results shown in FIGS. 12 and 13 were obtained, from which it is understood that the vibrations of the object 44 are sufficiently isolated while suppressing the width of the object 44 against the floor 41 to not more than ⅓.

Moreover, the strength was sufficiently held because the spring constant of the device itself became large by applying the voltage to all of the vibration isolating support members 42.

Then, when the weight of the object 44 was changed into 25 kg under a state that the voltage was applied to all of 16 vibration isolating support members 42, the vibration acceleration rate of the object showed an amplitude larger than the vibration acceleration rate of the floor (see FIG. 12) as shown in FIG. 14, and the vibrations were amplified.

This is due to the fact that the resonance frequency $f_0$ was 20 Hz and was coincident with the input vibration to cause resonance because the weight of the object 44 was changed to ¼.

Now, when the weight of the object 44 was changed to ¼ and the voltage was applied to only four vibration isolating support members 42 among the 16 members, the resonance frequency $f_0$ was 10 Hz, and the input vibration of 20 Hz was included in the vibration isolating zone.

In the latter case, the vibration acceleration rate of the object 44 significantly reduced its amplitude as shown in FIG. 15.

Moreover, the strength is low as compared with that of the previous experiment because the voltage is applied to only the four vibration isolating support members 42, but the weight of the loading object becomes small, so that there is no problem on the strength itself.

As mentioned above, the vibration isolating support device according to the invention can always be used in the vibration isolating zone by selectively applying the voltage to the vibration isolating support members in accordance with the weight of the loading object, so that it is rich in the general-purpose use.

According to the invention, the spring component can easily be changed by selectively applying the voltage to the vibration isolating support members utilizing the electroviscous fluid, so that the optimum vibration isolating effect can always be obtained in accordance with the weight of the loading object and the kind of the input vibration.

What is claimed is:

1. A vibration isolating device, comprising; a base, a plurality of support members placed on said base in parallel with each other, each support member comprising a two series layer of an electroviscous body and an elastomeric body, a cradle supported by said support members, said support members provided with means for applying voltage to each electroviscous body, respectively, and wherein said electroviscous body contains spaced upper and lower substrates, plural upper and lower electrode plates vertically arranged from said upper and lower substrates, respectively, and said electroviscous body under a no voltage condition has a spring constant smaller than that of said elastomeric body.

2. The device according to claim 1, wherein said voltage is selectively applied to said support members.

3. The device according to claim 1, wherein said electroviscous body comprises a flexible shell and said shell containing an electroviscous fluid.

4. The device according to claim 3, wherein said electroviscous fluid comprises a dispersion of silica gel in an insulating oil.

5. The device according to claim 1, wherein said upper and lower electrode plates are in parallel with each other.

6. The device according to claim 5, wherein said upper and lower electrode plates are annular.

7. The device according to claim 6 further comprising a central rod-like electrode.

* * * * *